Patented Feb. 13, 1940

2,190,450

UNITED STATES PATENT OFFICE 2,190,450

CELLULOSE ETHERS

Frederick C. Hahn, Upper Montclair, N. J., assignor to E. I. du Pont de Nemours & Company, Wilmington, Del., a corporation of Delaware No Drawing. Application January 3, 1938, Serial No. 183,133

14 Claims. (Cl. 260—231)

This invention relates to cellulose ethers. More particularly, it relates to the treatment with a wetting agent of cellulose to be used in the preparation of alkali cellulose and cellulose ethers. It especially appertains to the uniform incorporation of a wetting agent in cellulose prior to contacting the cellulose with caustic alkali or an etherifying agent.

Since the early work by Lilienfeld (U. S. Patent 1,188,376 of June 20, 1916) a tremendous amount of research work has been done on the preparation of cellulose ethers, and a myriad of patents and literature articles concerning the same have appeared. Numerous different processes with apparently unlimited variations have been disclosed in these publications, but it is significant that up to the present time there is still considerable room for improvement in the quality of the cellulose ethers which are being offered commercially.

This invention had for an object the preparation of cellulose ethers of commercially desirable properties. Further objects were the preparation of cellulose ethers of improved quality, of superior plastic properties of excellent film characteristics and increased uniformity. A further object was the preparation of an improved alkali cellulose and the provision of a method for etherifying cellulose in a readily controllable and economical manner. A general advance in the art and other objects which will appear hereinafter are also contemplated.

It has now been found that cellulose which has been treated with a wetting agent gives (upon treatment with the etherifying agents in the presence of alkali) cellulose ethers of enhanced uniformity and superior plastic film forming characteristics. More specifically, it has been found that a superior cellulose ether may be produced by a process wherein the cellulose is impregnated or steeped in an aqueous solution of a wetting agent prior to its contact with alkali or etherifying agent. Preferably this pretreatment step comprises wetting or steeping the cellulose with a dilute aqueous solution of the wetting agent and pressing off the excess liquid, the proportions being so chosen that at least .1% of the wetting agent is left in the cellulose. Ordinarily the aqueous treatment is followed by a drying step to remove the water in whole or in part. In a preferred embodiment the dried wetting agent containing cellulose is treated with a highly concentrated caustic solution, for example, 50% sodium hydroxide.

From the following description and specific examples, in which are disclosed certain embodiments of the invention as well as details of what is believed to be the best mode for carrying out the invention, it will be apparent how the foregoing objects and related ends are accomplished. The quantities are given in parts by weight throughout the application.

Example I

One hundred (100) parts of granulated cellulose pulp board were, while being constantly agitated, sprayed with 400 parts of an aqueous solution of "Alkanol M" (defined below) of one-half per cent strength. The cellulose granules after being wetted in this manner were dried at 60° C. The resulting dried granules which contained approximately 3% of water were mixed with 392 parts of caustic sode, 180 parts of water, 500 parts of ethyl chloride, and 813 parts of benzene, and the resultant introduced into an autoclave. The mixture was heated gradually to 150° C. over a period of one to two hours, and held at this temperature for four hours, the contents of the autoclave being continuously stirred during this time. The reaction mixture was cooled, treated with water, steam distilled to remove the volatile solvents, and the ethyl cellulose washed free from inorganic salts and dried. The product was practically completely soluble in benzene, toluene, ethyl acetate, and in an 80–20 ethyl alcohol-toluene mixture. Clear, tough and colorless films were obtained from these solutions of ethyl acetate.

Example II

One hundred (100) parts of cellulose pulp board chips prepared by cutting pulp board $\frac{1}{16}$ inch thick into chips approximately $\frac{1}{8}$ inch by $\frac{1}{16}$ inch, were wetted uniformly with 180 parts of a dilute aqueous solution of the wetting agent "Alkanol M" and then dried. The dried chips container about one-half of one per cent of the wetting agent based on the cellulose. These chips, together with 119 parts of water, 236 parts of solid caustic soda, 280 parts of ethyl chloride and 566 parts of benzene, were charged into an autoclave. The mixture, with continual stirring, was gradually heated to 150° C. and held at that temperature for about 5 hours. The resulting ethyl cellulose was isolated and purified as described in Example I. The product had excellent solubility and gave films of very high quality.

Example III

Wood pulp cellulose in the form of sheets containing approximately 95% of alpha-cellulose was passed continuously through a 1% aqueous solution of sodium isobutyrate and then through squeeze rolls to press out the excess solution. The pressed sheets containing approximately 2 parts of solution per unit of cellulose were dried and disintegrated into granules by a chipping machine of the type disclosed in U. S. Patent 2,028,080. The dry granules contained approximately 2% of sodium isobutyrate.

Two hundred and thirty-six (236) parts of solid sodium hydroxide, 119 parts of water, and 566 parts of benzene were mixed and heated to 70° C. over a period of about one-half hour, forming an emulsion of a very concentrated caustic soda solution in benzene. One hundred (100) parts of dry granulated pulp board prepared as above were thoroughly mixed with the foregoing emulsion by stirring for about one hour at a temperature of 70°–90° C. Two hundred and eighty (280) parts of ethyl chloride were added and the resulting mixture with continuous agitation gradually heated to 150° C. over a period of two hours. This temperature was maintained with agitation for 5 hours. The resulting ethyl cellulose was isolated from the reaction mixture and found to be soluble in the usual ethyl cellulose solvents, for example, the toluene-ethyl alcohol (20–80) mixture. Plastic sheeting of very superior characteristics, especially clarity, was manufactured from this material.

Example IV

Cotton linters cellulose in the form of sheets was passed continuously through an aqueous solution containing 1% of "Alkanol M" and then through squeeze rolls to press out the excess solution. The cellulose is swollen by this aqueous solution treatment, and the wetting agent is carried into and uniformly distributed throughout the cellulose fiber. The resulting impregnated sheets containing approximately 2 parts of solution per unit part of cellulose were dried and disintegrated into small chips according to the disclosure in U. S. Patent 2,028,080. The drying leaves the desired amount of wetting agent in the fiber, which as a result thereof, is in excellent condition for further reaction with alkali to form alkali cellulose, and with an etherifying agent to form a cellulose ether. The dry granules contained approximately 2% of the wetting agent. Caustic soda (354 parts), water (167 parts), and benzene (792 parts) were charged into an autoclave. The mixture was heated to 65° C. and agitated until all the caustic soda dissolved in the water. As a result there was obtained a two-layer system consisting of a very concentrated sodium hydroxide solution under benzene. Agitation was discontinued and 150 parts of the aforementioned cellulose chips introduced. Agitation was resumed, and the resulting mass heated at 65°–100° C. for two hours. The resulting suspension of alkali cellulose in benzene was treated with 486 parts of ethyl chloride. This mixture, while being agitated, was heated to 150° C., and the agitation at that temperature continued for 6 hours. The resulting ethyl cellulose was isolated from the reaction mixture by known methods. It yielded films of the highest quality.

Example V

High alpha cellulose wood pulp board was steeped in a dilute solution of sodium isobutyrate and afterwards dried until the moisture content was 1%. The concentration of the wetting agent solution was such that 0.5% of sodium isobutyrate remained in the pulp board. The board was then granulated in the manner previously described, and 140 parts thereof added to the body obtained by mixing 352 parts of 50% sodium hydroxide, 174 parts of flake caustic and 830 parts of benzene. The addition was made at 70° C. The resultant was placed in an autoclave, agitation started, and continued at 70°–90° C. until the inert diluent was substantially free from caustic solution and the caustic solution was uniformly distributed throughout the cellulose. Ordinarily 15 minutes to 1 hour is sufficient for this operation. Four hundred and thirty-four (434) parts of ethyl chloride containing 0.32 part of isobutyric acid dissolved therein were then added, and the resulting mixture was agitated and heated for from 5 to 10 hours at 135°–165° C. The resulting ethyl cellulose was isolated and purified in the known manner. It had the very superior characteristics previously mentioned.

Example VI

Two hundred and thirty-six (236) parts of solid caustic soda, 119 parts of water and 566 parts of benzene were mixed and heated to 70° C. over a period of about one-half hour, forming an emulsion of a very concentrated caustic soda solution in benzene. One hundred (100) parts of dry granulated pulp board containing about 1% (based on the cellulose) of "Alkanol M" were violently mixed with the foregoing emulsion for about one hour at a temperature of 70°–90° C. The aforementioned cellulose was prepared by impregnating cellulose with an aqueous solution of the wetting agent, pressing out excess solution, and drying. Two hundred and eighty (280) parts of ethyl chloride were added and the resulting mixture while being continually agitated was gradually heated to 150° C. over a period of two hours and maintained at this temperature for five hours. The resulting ethyl cellulose was isolated from the reaction mixture and purified in the known manner. The product dissolved in toluene-ethyl alcohol (20–80) and various other solvents. The resulting solutions had a high degree of clarity and were practically colorless. Plastic sheeting manufactured from this material was characterized by a high degree of clarity and substantial freedom from color.

Example VII

Two hundred and thirty-eight (238) parts of 50% caustic soda solution, 117 parts of solid caustic soda, 560 parts of benzene, and 1 part of ethyl cellulose were violently stirred and raised in temperature (heated) to 70° C. The solid caustic soda dissolved completely, and the resulting very highly concentrated caustic soda solution emulsified with the benzene. One hundred (100) parts of dry granulated pulp board containing 2% of "Alkanol M' (prepared as described in the preceding example) were introduced into the foregoing emulsion while agitating the mass, and the mixing continued for about one-half hour at 70°–90° C. Two hundred and eighty (280) parts of ethyl chloride were added, and the resulting mixture, while continuously agitated, was heated to 150° C. over a period of about two hours and maintained at this temperature for four to five hours. The resulting ethyl cellulose after isolation and purification in the known manner possessed the very high qualities previously described.

Example VIII

Thirteen hundred and thirty (1330) parts of caustic soda, 1620 parts of water, 1000 parts of benzene and 5 parts of ethyl butyl cellulose were mixed vigorously at ordinary normal room temperature to produce an emulsion. To the emulsion was added 530 parts of granulated pulp board in granules approximately ⅛ inch by ⅛ inch by 1/16 inch, with an apparent bulk density of about 16 pounds per cubic foot, containing less than 3% moisture and having uniformly distributed therein 10.5 parts of sodium isobutyrate. The granules were prepared as described in Example VI. The mixture was agitated for about one hour. This intimate mixture of cellulose and alkali was then treated with 590 parts of ethyl chloride and heated and agitated for six hours at 100°–116° C. The mixture was then treated with 1218 parts of butyl chloride and heated for ten hours at 135° C. to 140° C. The resulting ethyl butyl cellulose after purification in a known manner was found to be definitely superior to an ethyl butyl cellulose prepared in a similar manner using the same type of cellulosic raw material in the absence of a wetting agent.

Example IX

Twenty-three hundred and sixty (2360) parts of caustic soda, 1190 parts of water, and 5660 parts of benzene were added to an autoclave and while stirring, heated to 72° C. The caustic soda dissolved in the water and was then emulsified in the benzene. At this point 1000 parts of cellulose in the form of granules, prepared according to the disclosure in U. S. Patent 2,067,946 issued January 19, 1937, to Picton, and pretreated (by spraying an aqueous solution of the wetting agent on the stock from which the granules were prepared) to contain 0.7% "Alkanol M", were added and the mixture stirred for fifteen minutes, then 2800 parts of ethyl chloride were added and the stirring continued and the reaction mass heated from 140°–160° C. for six to eight hours. A solution of 10 parts of Turkey red oil in 7800 parts of water was added to the reaction mass while hot, and the mixture stirred to secure uniform incorporation of the emulsifying agent and to dissolve the sodium chloride, and the resulting emulsion was passed through a filter and run directly and rapidly into a precipitating bath consisting of several thousand parts of boiling water. The resulting ethyl cellulose after washing with water gave films which were superior to those prepared in the same manner in the absence of a wetting agent in the stock cellulose granules.

Example X

Twenty-six hundred (2600) parts of alkali cellulose prepared by steeping dry cellulose impregnated with 1.75% of "Alkanol M" in 22% caustic soda solution and pressing out the excess liquor containing approximately 1000 parts of cellulose, 475 parts of caustic soda and 1125 parts of water were mixed with 1885 parts of solid caustic and shredded until the mixture was uniform. To the resulting mixture in an autoclave were added 3480 parts of ethyl chloride, 65 additional parts of water, and 5660 parts of benzene, and the resultant stirred and heated for from six to eight hours at 150°–160° C. Ten (10) parts of Turkey red oil and 1000 parts of water were added to the reaction mass after cooling, and the mixture stirred to obtain uniform incorporation of the water and emulsifying agent. The resulting uniform viscous emulsion was thinned with 1000 parts of benzene and 500 parts of ethyl alcohol and run slowly in a small stream into boiling water maintained in a state of violent agitation and continually heated with an injection of live steam. The steam bubbling vigorously up through the water carried the organic compounds (solvents) out of the precipitating chamber. The ethyl cellulose was precipitated in a fine, fluffy, fibrous form, and was readily purified by washing with water. It gave films superior to those obtained in the same manner from the same type of cellulose which had not been pretreated with a wetting agent.

Example XI

Caustic soda (177 parts), water (83.5 parts), and benzene (396 parts) were charged into an autoclave. The mixture was heated to 65° C. and agitated until all the caustic soda dissolved in the water. As a result there was obtained a two-layer system consisting of a very concentrated sodium hydroxide solution under benzene. Agitation was discontinued, and 75 parts of granulated wood pulp board prepared according to the disclosure in U. S. Patent 1,872,181 issued August 16, 1932, to Picton and containing 3.0% "Alkanol M" (which had been obtained by impregnating pulp board granules with an aqueous solution of 1% "Alkanol M" and drying), were introduced. Agitation was resumed, and the resulting mass heated at 65°–100° C. for two hours. The resulting suspension of alkali cellulose in benzene was treated with 243 parts of ethyl chloride. This mixture, while being agitated, was heated to 150° C., and the agitation at that temperature continued for six hours. The resulting ethyl cellulose was isolated from the reaction mixture by known methods. It yielded films of the highest quality.

Example XII

Wood pulp board of 95% alpha cellulose content was steeped in a dilute solution of sodium isobutyrate and afterwards dried. The concentration of the wetting agent solution was such that 0.5% of sodium isobutyrate remained in the pulp board. The board was then granulated or chipped in the manner previously described, and 140 parts thereof added to a mixture of 174 parts of flake caustic, 0.4 part of sodium isobutyrate, 352 parts of 50% caustic soda solution and 830 parts of benzene in an autoclave. The addition was made at 70° C., agitation started, and continued at 70°–90° C. until the inert diluent was substantially free from caustic solution and the caustic solution was uniformly distributed throughout the cellulose. Ordinarily 15 minutes to 1 hour is sufficient for this operation. Four hundred and thirty-four (434) parts of ethyl chloride were then added and the resulting mixture was agitated and heated for from 5 to 10 hours at 135°–165° C. The resulting ethyl cellulose was isolated in the earlier described manner. It had the very superior characteristics, such as high clarity, previously mentioned.

Example XIII

One hundred (100) parts of granulated cellulose pulp board, prepared by granulating wood pulp sheets aproximately 1/16 inch thick into shreds approximately ¾ inch in length and 1/16 inch in width, were placed in a large rotating drum and sprayed continuously while rotating with 300 parts of an aqueous solution containing 0.5% of "Alkanol M". The resulting uniformly impregnated granules were dried at a temperature of 60° C. Caustic soda (180 parts), water (85 parts), and benzene (400 parts) were charged into an autoclave. The mixture was heated to 65° C. and agitated until all the caustic soda dissolved in the water. As a result there was obtained a two-layer system consisting of a very concentrated sodium hydroxide solution under benzene. Agitation was discontinued and 75 parts of the previously prepared cellulose particles added; then agitation was again started and the resulting mass heated at 65°–100° C. for two hours. The resulting suspension of alkali cellulose in benzene was treated with 243 parts of ethyl chloride. This mixture, while being agitated, was heated to 150° C., and the agitation at that temperature continued for six hours. The resulting ethyl cellulose was isolated by running the reaction mixture in a small stream into a large body of boiling water and separating the precipitated ethyl cellulose from the same.

Wetting agents stable (i. e., functional as such) in alkali may in general be employed. The "Alkanol M" mentioned in some of the specific examples is a preferred reagent. It consists of the sodium salts of acids prepared by the oxidation of the mixture of oxygenated carbon (organic) compounds obtained by the catalytic hydrogenation of carbon oxides under elevated temperatures and pressures. These acids may be obtained by processes such as those described in U. S. Patent 1,856,263, or by two-step oxidation of the alcohols to the acids. Salts of somewhat varying characteristics are obtained from different fractions of the acids thus obtained. The salts of the acids of 4 to 8 carbon atoms are considered to be particularly useful for the purposes of this invention. Other substances having suitable alkali stability include sodium isobutyrate and sodium lauryl sulfate.

The amount of wetting agent utilized is usually not very large. It is preferred to use an amount corresponding to about 0.5% to 2% of the cellulose. Ordinarily the amount employed will not fall without the range of 0.5% to 5.0%. No advantage has been found in using quantities greater than 5%.

So long as the wetting agent is uniformly distributed or incorporated in the cellulose fiber it may be added in any desired manner. The most satisfactory methods at present known for securing this uniform penetration are wetting of the fibers with aqueous solutions of the wetting agents by spraying, or steeping, followed by drying coupled with pressing, if found convenient or expedient.

The cellulose may be in any of the usual forms and from varying sources. Wood pulp in the form of dense granules is preferred in carrying out the invention. The production of a cellulose starting material of this character is described in detail in U. S. Patent 2,067,946 of January 19, 1937. In general terms this product may be described as a granulated cellulose in which the granules have dimensions of the order of ⅛ inch by ⅛ inch by 1/16 inch and an apparent bulk density of about 16 pounds per cubic foot. The invention is not limited to chips or granules having such characteristics or even wood pulps in general, but includes cellulose from other sources such as cotton hulls, bagasse, ramie, flax, regenerated cellulose from viscose, cuprammonium and other solutions. Cotton and cotton linters are particularly suitable. Cellulose pretreated in various ways, for example, with acids such as formic, acetic, nitric and sulfuric, may be used. Hydrocellulose (or oxycellulose) and the low substituted cellulose derivatives may also be mentioned as starting materials.

Incorporation of the wetting agent in the cellulose gives an improvements in the alkali cellulose reaction and an improvement in the etherification reaction. The cellulose ethers produced from cellulose which has been pretreated with the wetting agent are superior to those obtained when the wetting agent is not added until the etherification reaction. It appears, therefore, that the additional advantage obtained in the etherification reaction according to the present invention is due primarily or especially to a change in the alkali cellulose production reaction. The pretreatment with the wetting agent has been found to be especially advantageous when in the subsequent treatment with alkali to form alkali cellulose very concentrated caustic solutions, for example 50% and higher, are employed. Maximum advantage is derived when the product prepared is a fully substituted alkyl cellulose, for example, ethyl cellulose suitable for the preparation of films of maximum clarity and the etherification process involves a high ratio of alkali and a low ratio of water based on the cellulose.

Cellulose pretreated with the wetting agent as above disclosed or in an equivalent way may be etherified in any desired manner. It appears that the pretreatment of cellulose with a wetting agent improves the quality of the alkali cellulose and of the cellulose ether regardless of the method of etherification.

Examples 6 and 7 are taken from my U. S. A. Patent No. 2,161,815, issued June 13, 1939, filed November 13, 1935.

As many apparently widely different embodiments of this invention may be made without departing from the spirit and scope thereof, it is to be understood that I do not limit myself to the specific embodiments thereof except as defined in the appended claims.

I claim:

1. In the etherification of cellulose, the steps which comprise intimately associating cellulose and a small amount of an alkali stable wetting agent for cellulose of the group consisting of alkali metal isobutyrates and alkali metal salt of the acids prepared by the oxidation of the mixture of oxygenated carbon compounds obtained by the catalytic hydrogenation of carbon oxides under elevated temperatures and pressures, by treating the cellulose with a solution of the wetting agent, removing the solvent and treating the dry cellulose and associated uniformly distributed wetting agent with an etherifying agent.

2. The process which comprises wetting cellulose with an aqueous solution of an alkali stable wetting agent for cellulose, drying, and etherifying the dried wetting agent containing cellulose.

3. In the process of preparing alkali cellulose the steps which comprise wetting cellulose with an aqueous solution of alkali stable wetting agent for cellulose, drying, and forming alkali cellulose by treating the resultant dried wetting agent containing cellulose with an aqueous solution of caustic soda.

4. In the process of preparing cellulose ethers, the steps which comprise wetting cellulose with an aqueous solution of alkali stable wetting agent for cellulose, drying, forming alkali cellulose by treatment of the dry cellulose containing at least .1% and not greater than 5% of the wetting agent uniformly distributed with an aqueous solution of caustic soda, and etherifying by treatment with an etherification agent.

5. The process of preparing ethyl cellulose which comprises the steps of wetting cellulose with an aqueous solution of alkali stable wetting agent for cellulose, drying, forming alkali cellulose by treating the dried wetting agent containing cellulose, having at least .1% and not greater than 5% of the wetting agent, with an aqueous solution of caustic alkali, and ethylating by treating with an ethylating agent.

6. In the process of preparing high-quality ethyl cellulose the steps which comprise wetting cellulose with an aqueous solution of alkali stable wetting agent for cellulose, drying, forming alkali cellulose by treatment of the dried wetting agent containing cellulose, having 0.5%–5% of the wetting agent with aqueous caustic soda of more than 50% strength, and ethylating by treatment with an ethylating agent.

7. The process of preparing ethyl cellulose which comprises wetting granulated cellulose with an aqueous solution of alkali stable wetting agent for cellulose, drying, treating the dried wetting agent containing cellulose, having 0.5%–2% of the wetting agent with caustic soda of greater than 50% concentration to form alkali cellulose, and reacting the alkali cellulose with ethyl chloride.

8. The process of claim 7 in which the wetting of the cellulose is accomplished by spraying it with the wetting agent solution.

9. The process of preparing an ethyl cellulose which comprises soaking cellulose with an aqueous solution of sodium isobutyrate, drying, treating the dried wetting agent containing cellulose, having 0.5%–5% of the wetting agent with caustic soda of greater than 50% concentration to form alkali cellulose, and reacting the alkali cellulose with an ethylating agent.

10. The process which comprises soaking cellulose in a solution of sodium isobutyrate of such concentration that, upon drying, the cellulose contains about 0.5% of sodium isobutyrate by weight, drying, treating the dried wetting agent containing cellulose with caustic soda of greater than 50% concentration to form alkali cellulose, and reacting the alkali cellulose with ethyl chloride.

11. The process which comprises soaking 1 part of granulated wood pulp sheets in 3 parts of an aqueous solution containing 0.5% sodium isobutyrate, drying the resulting granules at 60° C., adding 75 parts of the dried cellulose particles to a two-layer system consisting of concentrated aqueous sodium hydroxide solution under benzene, there being 180 parts of sodium hydroxide, 85 parts of water, and 400 parts of benzene present, agitating the resulting mass while heating at 65°–100° C. for 2 hours, treating the resulting suspension of alkali cellulose in benzene with 243 parts of ethyl chloride, with agitation for 6 hours while maintaining a temperature of about 150° C. and isolating the resulting ethyl cellulose.

12. The process which comprises impregnating cellulose pulp board chips with about 0.5% of an alkali stable wetting agent for cellulose by spraying or soaking with a wetting agent solution of appropriate concentration, drying, wetting the dried wetting agent containing cellulose with an inert organic liquid, forming alkali cellulose from the same by treatment with a solution of caustic alkali containing more alkali than will dissolve in the water present at ordinary normal room temperatures and ethylating the resulting alkali cellulose by reacting it with an ethylating agent.

13. The process of claim 4 when the wetting agent is a member of the group consisting of alkali metal isobutyrates and alkali metal salt of the acids prepared by the oxidation of the mixture of oxygenated carbon compounds obtained by the catalytic hydrogenation of carbon oxides under elevated temperatures and pressures.

14. The process of preparing alkali cellulose which comprises treating dry cellulose with sodium hydroxide solution in the presence of inert diluent, the sodium hydroxide solution being stronger than 50% and the cellulose containing an alkali stable wetting agent for cellulose and being contacted with the inert diluent before with the sodium hydroxide solution.

FREDERICK C. HAHN.